US005404048A

United States Patent [19]
Panner

[11] Patent Number: 5,404,048
[45] Date of Patent: Apr. 4, 1995

[54] ELECTRONIC BILGE PUMP SWITCH

[75] Inventor: Edward J. Panner, Fort Myers, Fla.

[73] Assignee: Aim Technologies, Inc., Cape Coral, Fla.

[21] Appl. No.: 103,074

[22] Filed: Aug. 6, 1993

[51] Int. Cl.$^6$ .............................................. G01F 23/00
[52] U.S. Cl. ................................... 307/118; 73/304 R
[58] Field of Search ................... 307/118; 417/36, 12; 361/178; 318/482, 642, 484; 73/304 R, 308, 290 R; 114/183 R; 116/109

[56] References Cited

U.S. PATENT DOCUMENTS

| 4,171,932 | 10/1979 | Miller | 307/118 |
|---|---|---|---|
| 4,341,178 | 7/1982 | Price | 114/183 |
| 4,678,403 | 7/1987 | Rudy et al. | 307/118 |
| 4,697,535 | 10/1987 | Wileman, III | 114/183 R |
| 4,881,873 | 11/1989 | Smith et al. | 417/12 |
| 4,897,822 | 1/1990 | Korten et al. | 367/124 |
| 5,097,248 | 3/1992 | Kumada et al. | 338/80 |
| 5,130,708 | 7/1992 | Boyden | 340/984 |

OTHER PUBLICATIONS

"Bilge Tender" Advertisement, Florida Sportsman, Jul. 1990, p. 186.
"Bilge Tender" product brochure, 1990.
Jabsco Bilge Pump Switch Advertisement.
"Water Witch" Product Advertisment, Sensatron, Inc., 1987.
Product Packaging from the "Hydro-Air" Switch, Manufactured by Jabsco Products (Date unknown).

Primary Examiner—Jeffrey A. Gaffin
Assistant Examiner—Peter Ganjoo
Attorney, Agent, or Firm—Troutman Sanders; Joel S. Goldman; Gregory J. Kirsch

[57] ABSTRACT

The invention relates to a liquid sensing switch for use primarily in sensing the bilge water level aboard a boat. The switch is designed with a high input impedance and a high trigger sensitivity, so that the presence of a liquid may be detected by using a remotely located single wire probe. The probe is able to sense immersion into low conductivity liquids or into liquids where no hardwired ground is provided, such as within fiberglass boat hulls. In order to prevent false triggering and cyclic operation of the bilge pump, the liquid sensing switch provides a time delay before it is activated, as well as a further time delay before being deactivated.

9 Claims, 2 Drawing Sheets

ELECTRONIC BILGE PUMP SWITCH

BACKGROUND OF THE INVENTION

1. Technical Field

This invention relates to liquid level sensing and, more particularly, to such sensors which are used for detecting high water levels in the bilge areas of boats and for controlling bilge pumps.

2. Description of the Prior Art

High water levels in the bilge area of a boat can be detected by electronic or mechanical sensor/switches. The bilge of a boat, however, is a harsh environment for a bilge pump trigger switch, especially in a salt water environment. This condition often causes both mechanical and electrical water level sensors to fail due to debris within the bilge, fowling and degradation from oily water, and corrosion from salty water. Additionally, electronic sensor/switches usually require a constant source of power to maintain sensing capability, presenting battery depletion problems.

Automatic detection of water in the bottom of boats is most commonly performed with a mechanical float switch such as the one disclosed in U.S. Pat. No. 4,697,535. This type of switch typically uses mechanical contacts that close when water levels are high enough to lift the float. Failure can occur when debris and corrosion jam the float, or when corrosion prevents the electrical contacts from closing. Proper mounting of a float switch is critical since placement requires enough room to allow free movement. In addition, sloshing bilge water frequently triggers the pump causing unnecessary pump cycling. Frequent cycling of the pump discharges the battery prematurely and causes excessive wear of pump and motor components.

Other bilge pump switches have been developed which are triggered in response to air pressure. This type of switch utilizes a tube closed at one end mounted vertically with the closed end upward. Disposed within the tube is a diaphragm and microswitch mounted thereon. The tube is sealed at a lower end with an inverted moveable cup. When bilge water reaches the lower end of the tube and rises still further, the water within the inverted cup is urged upward within the tube and increases internal tube pressure which displaces the diaphragm, thus closing the switch and triggering the bilge pump. Disadvantages of this system include leakage of water into the sealed portion of the air tube due to deterioration of the diaphragm or tube, and deterioration of plastic parts in the salty, oily water of the marine environment. For example, the inverted cup degrades from the presence oil in the water, often requiring replacement. Also, the microswitch mechanism becomes unreliable in such an environment.

Recently, electronic sensor/switches have been developed for water level sensing. U.S. Pat. Nos. 4,897,822 (Korten et al.), and 4,881,873 (Smith et al.) disclose fully electronic liquid level sensors, automatic activation/deactivation of a bilge pump, and time delay circuitry to prevent false activation/deactivation of the pump. The bilge level is detected by measuring a change in media density proximal to acoustic sensors. In these designs, one acoustic transducer transmits acoustic waves to a second receiving transducer. Since bilge water has a greater density than air, a greater amount of acoustic energy is transmitted through bilge water than air. Thus, when bilge water comes into proximity with the transducers, the pump is activated in response to a predetermined increase in transmitted acoustic energy.

A second type of electronic switch is a conductive type switch. Korten et al discuss prior art "probes which utilize the conductivity of the fluid being sensed in contact with the probes creating an electrical path to activate the bilge pump." (See Col. 1, Lines 33–41). These switches typically contain integrated circuits and demand constant power to sense high water levels. They use two electrical contacts one of which is usually submersed in the water; therefore cleaning is recommended. Conductive switches utilize sealed electronics located in the bilge. Accordingly, disadvantages include the need for adequate mounting space, and susceptibility of circuitry to the bilge environment.

Still another type of liquid sensing switch utilizes a single probe. An example is the Bilge Tender liquid sensing switch (referred to as the "Bilge Tender switch", which has previously been manufactured and sold by AIM Technologies of Cape Coral, Fla. This device uses the ship's hull surface as a path to ground to complete a circuit when water touches the probe. The Bilge Tender switch utilizes a remotely located single wire probe for sensing immersion in low conductivity liquids or in liquids where no hardwired ground is provided. The Bilge Tender switch also automatically activates/deactivates a bilge pump, incorporates time delay circuitry to prevent false triggering, and is fully electronic.

Referring to FIG. 1, a block diagram of a single probe liquid sensing switch of the prior art Bilge Tender switch is shown. Probe 5 is located within a bilge portion of a boat hull. Probe input amplifier 10 provides the necessary sensitivity and turn-on delay for single probe operation of the liquid sensitivity switch. Since the output voltage (depicted at reference numeral 15) of probe input amplifier 10 increases over time, the output is inverted by inverter 20 for input to integrated monostable stage 30. Thus, inverter 20 inverts the output of probe input amplifier 10 to provide a decreasing signal to trigger integrated monostable stage 30 at its threshold voltage. When integrated monostable stage 30 is triggered, output 35 triggers output transistor driver 40. Output 45 from output transistor driver 40 activates high current PNP load driver 50 which provides the necessary current to drive pump 60, via line 55.

Output transistor driver 40 is necessary in this prior art design since output 35 from integrated monostable stage 30 is not high enough to drive the output transistor pair within the high current PNP load driver 50 directly.

FIG. 2 illustrates the prior art bilge switch of FIG. 1 in greater detail. Here, the negative terminal of the battery is in contact with the bilge water. When probe 5 becomes immersed in bilge water from the accumulation of water in the bilge area of the boat, capacitor C1 begins to charge. This charging period T1 represents the initial time delay between the time at which probe 50 contacts the water and the time at which U1 is activated (due to transistors Q1 and Q2). If probe 60 emerges from the water before time T1 has elapsed, capacitor C1 discharges through resistors R1 and R2. The time delay T1 is a function of bilge conductivity (which dictates the current flowing though probe 5), and the values of C1, R1, R2, and R3. Given a desired time delay T1, the respective values of the components are appropriately chosen.

When the voltage at node A drops a predetermined value below 12 V (typically about 0.4 V), output 15 from transistor Q1 increases to a predetermined value from 0 (typically 8 V). Since output 15 from transistor Q1 increases after it is triggered, output 15 must be inverted to properly trigger the 555 integrated circuit U1. Thus, transistor Q2 inverts output 15 from transistor Q1 to create decreasing output 25 at node C. When the voltage at node C drops near the saturation voltage of transistor Q2, the 555 integrated circuit U1 triggers and remains activated for a run time T2, as determined by the values of resistor R8 and capacitor C2. If water coming into the bilge is not pumped below the level of probe 5 during the run time T2, the 555 integrated circuit U1 immediately triggers again. On the other hand, if the probe 5 is out of water for a period greater than T1, the 555 integrated circuit U1 finishes its cycle of time T2 and deactivates. During activation time T2, output 35 from U1 is not sufficient to drive Q4 directly. Thus, output transistor Q3 provides the necessary current for output transistor pair Q4. Output 45 from transistor Q3 drives output Darlington PNP transistor pair Q4, activating pump 60 via output 55.

The Bilge Tender single probe device as described above has several disadvantages. Probe input sensitivity in this prior art device is approximately 10,000 ohms. This relatively low sensitivity makes this device particularly vulnerable to probe corrosion or fowling, which enhances the likelihood of failure due to diminishing probe sensitivity. Additionally, the 555 timing integrated circuit U1, which receives output from the sensitivity transistors Q1 and Q2, creates a minimum current draw of 10–20 milliamperes, which can drain the battery of a boat over a relatively short period of time. Also, the overall drive requirement of the Bilge Tender switch is rather high at about 1 ampere. Furthermore, the transistor pair Q4 generates excessive heat and requires a heat sink. Finally, Q4 must be thoroughly insulated from ground since it is a large Darlington PNP driver, which greatly increases the cost of the system.

Table I below illustrates the values for all resistances in FIG. 2, as well as the types of transistors. The integrated circuit type is listed also.

TABLE I

| Component | Value/Part Number |
|---|---|
| R1 | 47 KOhm |
| R2 | 4.7 KOhm |
| R3 | 10 KOhm |
| R4 | 27 KOhm |
| R5 | 27 KOhm |
| R6 | 4.7 KOhm |
| R8 | 470 KOhm |
| R9 | 10 KOhm |
| R10 | 2.2 KOhm |
| R11 | 390 KOhm, 1 Watt |
| R12 | 4.7 KOhm |
| R13 | 10 KOhm |
| C1 | 100 Microfarads |
| Q1 | 2N2906 |
| Q2 | 2N2222 |
| Q3 | 2N6388 |
| Q4 | 2N6286 |
| U1 | 555 Timing Integrated Circuit |
| Pump | Any 12 v pump |

Finally, each of the aforementioned prior art electronic switches have a variety of problems. They utilize probes with low sensitivities, expose too many electronic components to the bilge water, require a minimum current draw that is unacceptably high, etc.

SUMMARY OF THE INVENTION

The present invention recognizes and addresses the foregoing disadvantages, and others of prior art constructions and methods.

It is an object of the present invention to provide electronic circuitry for detecting the presence of a liquid.

It is another of the present invention to provide an electronic means of detecting the presence of bilge water in boats by using a remotely located single wire probe which can sense immersion into low conductivity liquids, or into liquids where no hardwired ground is provided, such as within fiberglass boat hulls.

Another object of the present invention is to provide circuitry to allow the detection of a liquid touching a sense probe while drawing essentially no current when in a standby mode.

Still another object of the present invention is to provide circuitry for detecting the presence of a liquid which includes a means of preventing false triggering, due to sloshing water, while increasing trigger sensitivity.

Still another object of this invention is to provide circuitry for detecting the presence of a liquid which utilizes a minimum run time without using an integrated circuit for timing.

It is also the object of this invention to provide a durable device for sensing liquid which requires no periodic maintenance or cleaning, can be mounted in extremely small bilge locations, and provides durable electrical operation.

Generally speaking, the invention relates to a liquid sensing switch for use primarily in sensing the bilge water level aboard a boat. The switch is designed with a high input impedance and a high trigger sensitivity, so that the presence of a liquid may be detected by using a remotely located single wire probe. The probe is able to sense immersion into low conductivity liquids or into liquids where no hardwired ground is provided, such as within fiberglass boat hulls.

More specifically, the invention relates to a liquid sensing switch having means to prevent false triggering and cyclic operation. False triggering and cyclic operation is prevented by circuitry which implements a time delay before the switch is activated, as well as a further time delay before the switch is deactivated. In order to achieve extremely high input sensitivity, the probe is connected to a PNP Darlington transistor pair, which is half of a complementary retriggerable monostable multivibrator. The complementary configuration of these transistors causes the present switch to draw no current in its "off" state. The output of the monostable multivibrator drives a PNP transistor buffer, which in turn drives an NPN Darlington relay driver. The relay driver drives a relay which may be configured to provide a predetermined voltage output, or may simply be utilized as a single-pole, single-throw (SPST) switch, for controlling an external device, such as a water pump.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

DETAILED DESCRIPTION OF THE INVENTION

Figure 3:
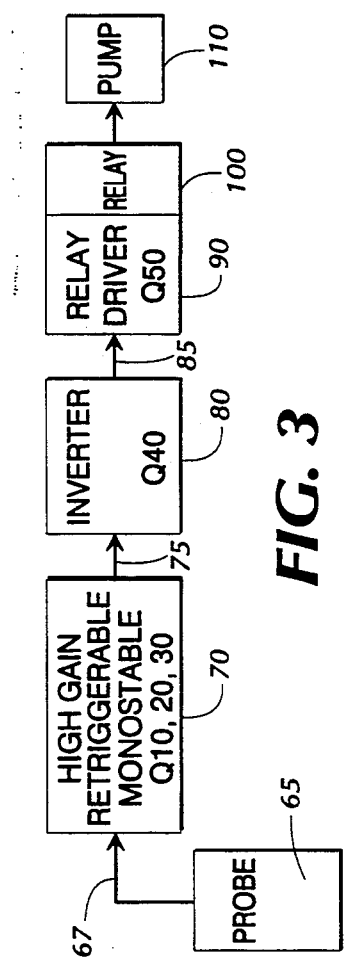
FIG. 3 is a block diagram of the bilge pump switch according to the present invention.

FIG. 3 illustrates a block diagram of the liquid sensing switch according to the present invention. Probe 65 is located within the bilge portion of a boat hull. High gain retriggerable monostable circuit 70 has means for providing a high input impedance and a high trigger sensitivity, so that the presence of a liquid may be detected by using the remotely located single wire probe 65. Circuit 70 amplifies signal 67 when bilge water comes into contact with probe 65 and remains retriggered until bilge water is out of contact of probe 65. Furthermore, circuit 70 includes means for providing a time delay before it is triggered, as well as a further time delay before being deactivated in order to prevent false triggering and cyclic activation of pump 110. Output signal 75 from the retriggerable monostable circuit 70 is inverted in circuit 80, and output signal 85 from inverter 80 then triggers relay driver circuit 90. Relay driver circuit 90 provides the necessary signal to drive relay 100 which provides the necessary means to drive pump 110.

Figure 4:
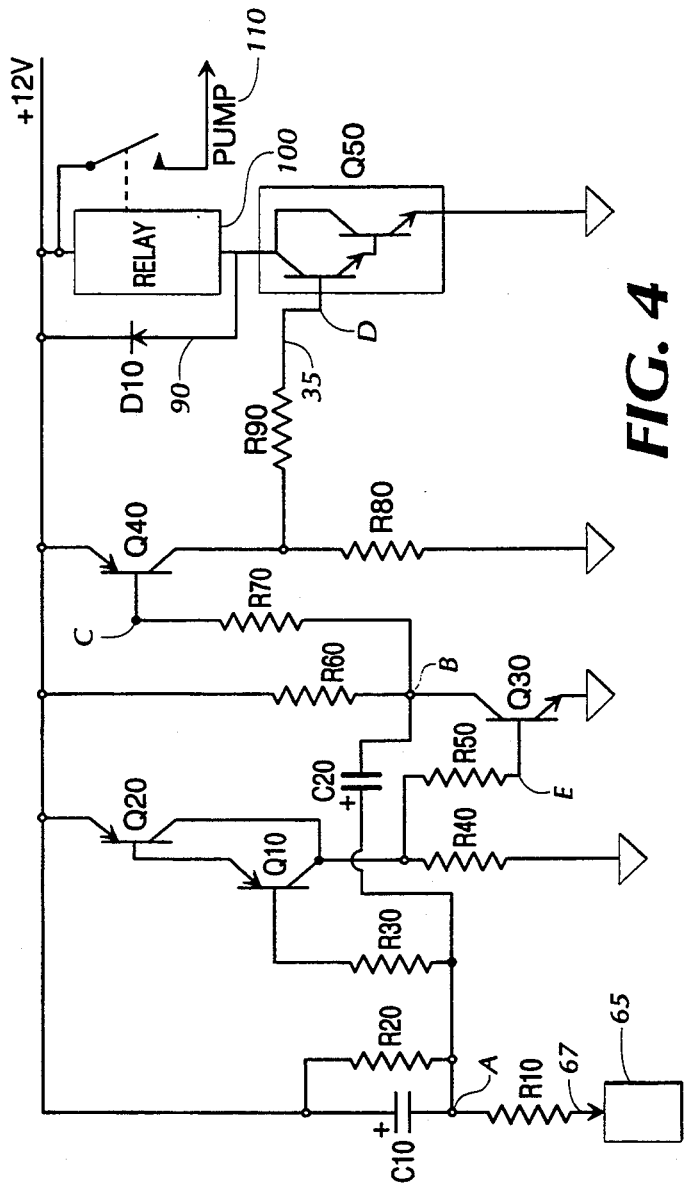
FIG. 4 is a schematic representation of bilge pump switch circuit according to the present invention.

FIG. 4 illustrates the bilge switch circuitry according to the present invention in greater detail. When the switch is installed into a boat having a surface conducting hull, the bilge switch circuitry and the negative terminal of the battery are normally grounded to the hull. When the water level in the bilge section of the boat comes into contact with probe 65 from accumulation therein, the ship's hull surface and water are used as a ground path to complete the bilge switch circuit and capacitor C10 begins to charge. When the bilge switch according to the present invention is installed into a boat having a hull made of fiber glass or some other non-conducting material, salts, minerals, and other conducting material deposited on the surface of the hull and bilge water provide a ground path for the bilge pump circuitry. In the case of either a conducting or nonconducting hull, leakage current along the hull surface closes the path of the sensing circuit after the probe has contacted the bilge water. The negative terminal of the ship's battery is normally connected to seawater through motors, fittings, hulls, and ground plates and thus to the bilge water by way of leakage paths which are sufficient to activate the bilge switch. Although not necessary to the invention, the negative terminal of the battery may be placed directly in contact with the bilge water. This may is accomplished, for example, by providing for an electrical connection between the negative terminal of the battery and the lowest portion of the bilge section of the hull where water is likely to accumulate first. This assures that when water accumulates in the bilge section of the hull, a path to ground will be provided from the probe 65, through the bilge water to the electrical connection in the bottom of the hull, and finally to the negative terminal of the battery. In any case, the location of the probe 65 is not restricted by the presence of an electrical connection to ground and does not have to be located at a fixed distance from an electrical connection to ground to operate properly. Therefore, probe 65 may be placed in any location in the bilge section of the hull deemed appropriate by the specific configuration or shape of the hull, or by the amount of bilge water that can be safely taken on by the boat, etc.

Before probe 65 becomes immersed in the water, the voltages of nodes A and B are at a maximum (12 V). When probe 65 becomes immersed in water due to accumulation of water in the bilge area of the boat, capacitors C10 and C20 begin to charge. After a time period T1, C10 becomes charged and the voltage at junction A decreases sufficiently to trigger the flip flop PNP Darlington transistor pair Q10 and Q20. The values of C10 and R20 govern the amount of time T1 associated with this delay. Transistors Q10 and Q20 represent one half of a complementary flip flop connected to function as a retriggerable monostable flip flop. The output of transistor pair Q10 and Q20 is connected to complimentary retriggerable monostable multivibrator transistor Q30 through resistor R50, while the output of transistor pair Q10 and Q20 is also connected to ground through resistor R40. When the probe 65 is out of the bilge water (standby mode), output capacitor C10 does not remain charged and transistor pair Q10 and Q20 are not triggered. Therefore, when the probe 65 is not in contact with the water, the bilge pump switch circuitry draws very little or no current. The amount of current drawn during stand by mode is limited by the leakage current of the transistors Q10, Q20, Q30, Q40, and Q50 and is on the order of 1-2 microamperes, which is negligible for this application. If the water level falls so that it is no longer touching the probe 65 during time period T1, the capacitor C10 discharges through R20. Thus, bilge water contacting the probe 65 from splashing during acceleration, deceleration, or pitching will not cause the bilge switch to cycle the bilge pump 110 excessively.

After Darlington transistor pair Q10 and Q20 are triggered, the voltage at node E decreases to near the saturation of transistor Q30, thus causing Q30 to conduct. When the voltage at node C decreases to near the threshold voltage of PNP transistor buffer Q40, transistor Q40 is triggered, inverting signal 75. Furthermore, when signal 85 nears the saturation voltage of NPN Darlington transistor pair Q50 within relay driver circuit 90, transistor pair Q50 is triggered and drives relay 100 via signal 95. Relay 100 may be configured to provide a predetermined voltage output, or may simply be utilized as a single-pole, single-throw (SPST) switch for controlling an external device, such as a water pump. As illustrated in FIG. 4, relay 100 may be utilized to switch pump 110 on via signal 95.

In order to provide adequate run time beyond the point when probe 65 emerges from the water, capacitor C20 is placed between nodes A and node B within high gain retriggerable monostable circuit 70. Upon activation of transistor pair Q10 and Q20 the voltage at node A is lowered. When transistor Q30 is activated, the voltage at B is lowered, further lowering the voltage at node A through capacitor C20. This assures that Darlington transistor pair Q10 and Q20 stays retriggered until the bilge water is sufficiently clear of the probe 65. The amount of time that Darlington transistor pair Q10 and Q20 stays retriggered after the bilge water has cleared probe 65 is determined by the values of C10, C20, and R20. For the values used in example one, this delay is typically 20 to 40 seconds.

Table II below illustrates the values for all resistances in FIG. 4, as well as the types of transistors, diodes, and the type of relay 100 used to activate the pump 110.

TABLE II

| Component | Value/Part Number |
|---|---|
| R10 | 220 KOhm |
| R20 | 100 KOhm |
| R30 | 150 KOhm |
| R40 | 5.6 KOhm |
| R50 | 22 KOhm |
| R60, R80 | 2.2 kohm |
| R70, R90 | 10 KOhm |
| C10 | 100 Microfarads |
| C20 | 25 Microfarads |
| Q10, Q20, Q40 | 2N3906 |
| Q30 | 2N6715 |
| Q50 | 2N6038 |
| Relay 100 | Potter Brumfield T90N1D12-12 |
| Pump | Any 12 V pump |

Figure 1:
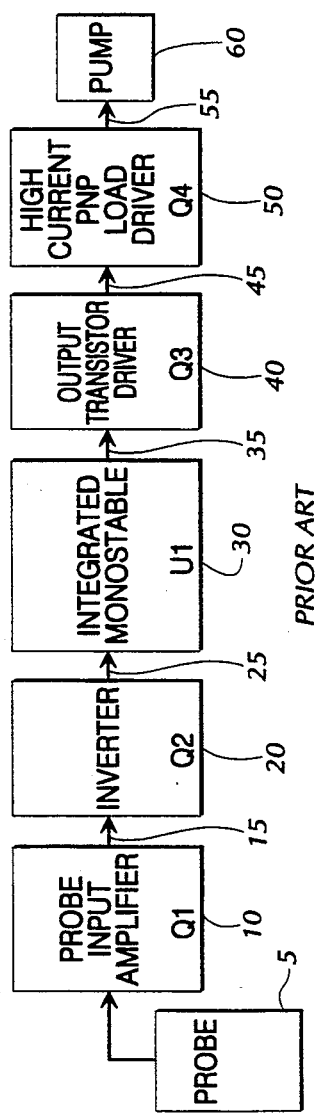
FIG. 1 is a block diagram of the Bilge Tender prior art bilge pump switch circuitry.
Figure 2:
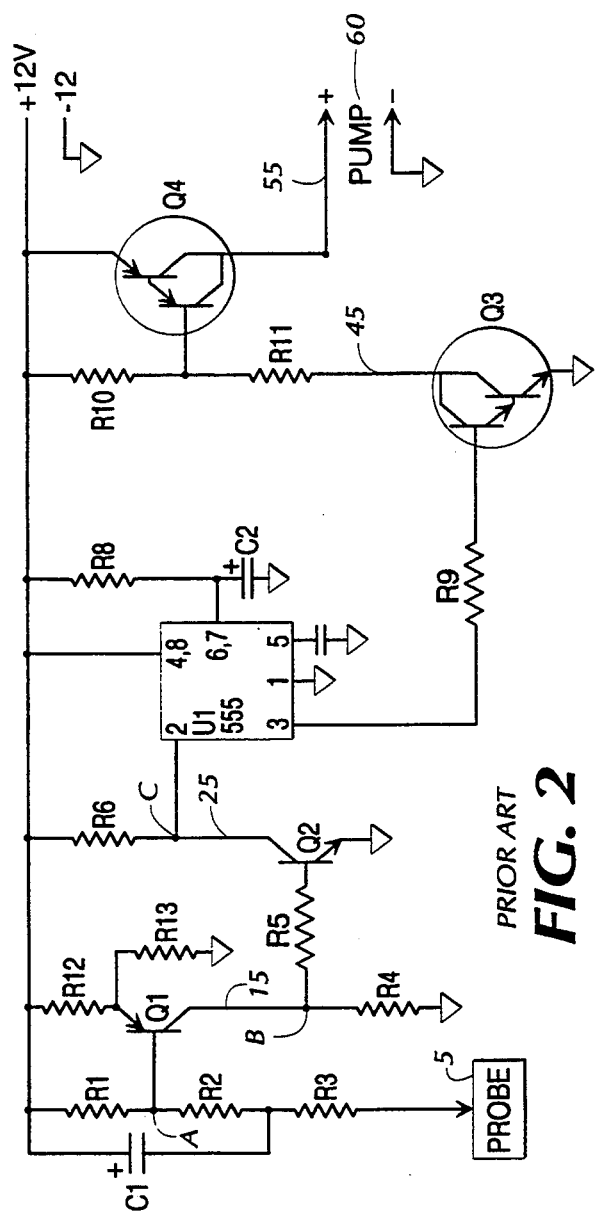
FIG. 2 is a schematic representation of prior art bilge pump switch circuitry of FIG. 1.

The use of the Darlington transistor pair Q10 and Q20 in combination with capacitor C20 eliminates the need for integrated circuit U1 (shown in FIG. 2 of the Bilge Tender) which produces timed signals, thereby reducing the cost of the switch. Additionally, the Darlington transistor pair Q10 and Q20 in combination with multivibrator transistor Q30 and resistors R20, R30, R40, R50, and R60 provide a greatly increased trigger sensitivity over the Bilge Tender prior art design of FIGS. 1 and 2. For the component values shown in Table II, the input sensitivity of the probe 65 is 50,000 ohms while the prior art Bilge Tender switch has a probe input sensitivity of 10,000 ohms using the components shown in Table I. Furthermore, the large and expensive output Darlington PNP driver Q4 of the prior art Bilge Tender switch has been eliminated as well as the necessary heat sink and ground insulation problem associated with it. Only a small Darlington driver transistor pair Q50 is needed to drive relay 100. The net result of these improvements is (1) higher probe sensitivity, (2) a physically smaller unit thereby eliminating virtually all mounting location problems, (3) negligible current draw in the stand by mode, (4) low manufacturing cost due to elimination of an integrated chip, the large Darlington PNP driver and associated heat sink, (5) a capability of handling a greater pump load since a relay is utilized to activate the pump, as well as other advantages.

It should be understood that various changes to the present invention may be made by the ordinarily skilled artisan, without departing from the spirit and scope of the present invention which is presented in the claims below. The ordinarily skilled artisan will understand that this disclosure presents an example of the invention and is not meant to limit the invention, as presented in the claims, in any way whatsoever.

What is claimed is:

1. A liquid sensing switch for connecting and disconnecting a device to a power source in response to a level of fluid in a bilge area of a boat comprising:

a probe for transmitting a first signal when a bilge fluid contacts said probe;

triggering means coupled to said probe for producing a triggering signal in response to said probe signal, wherein said probe and triggering means draw zero current from said power source when said probe is out of contact with said fluid; and switching means for connecting an external device to said power source in response to said triggering signal.

2. The liquid sensing switch of claim 1 wherein said triggering means includes means for delaying said triggering signal after said probe contacts said fluid.

3. The liquid sensing switch of claim 1 wherein said triggering means includes means for prolonging said triggering signal after said probe is out of contact with said fluid.

4. The liquid sensing switch of claim 1 wherein said probe contacts said fluid with a remotely located single wire.

5. A liquid sensing switch for connecting and disconnecting a device to a power source in response to a level of fluid in a bilge area of a boat comprising:

a probe for transmitting a first signal when a fluid contacts said probe;

means for amplifying said first signal;

triggering means for producing a second signal in response to said first signal, wherein said amplifying means and said triggering means draw zero current from said power source when said probe is out of contact with said fluid;

buffer means coupled to said triggering means for inverting said second signal thereby producing a third signal; and switch means coupled to said buffer means for connecting said device to said power source in response to said third signal.

6. The liquid sensing switch of claim 5 wherein said probe is a remotely located single wire probe.

7. The liquid sensing switch of claim 5 wherein said triggering means includes means for prolonging said second signal for a predetermined period of time after said probe is out of contact with said fluid, thereby preventing cycling of said switch means.

8. The liquid sensing switch of claim 5 wherein said triggering means includes means for delaying said second signal for a predetermined period of time after said probe contacts a fluid, thereby preventing false activation of said switch means.

9. A liquid sensing switch coupled to a power source for activating and deactivating a bilge pump in response to a level of a fluid in the bilge area of a boat comprising:

a single wire remotely located probe for transmitting a first signal when a fluid contacts said probe;

a PNP Darlington transistor pair coupled to said probe for amplifying said first signal thereby producing a second signal;

a complimentary retriggerable monostable multivibrator transistor coupled to said PNP Darlington transistor pair for receiving said second signal and producing a third signal such that when said probe is out of contact with said fluid, said liquid sensing switch draws zero current from said power source;

a PNP transistor buffer coupled to said complimentary transistor for inverting said third signal into a forth signal;

an NPN Darlington transistor pair relay driver for activating a relay for connecting a bilge pump to the power source in response to said forth signal;

probe signal delaying means coupled to said probe for delaying the triggering of said PNP Darlington transistor pair; and means coupled to said probe for prolonging said probe signal for a predetermined time after said probe is out of contact with said fluid, whereby said delaying means prevents false triggering of said switch and said prolonging means prevents cycling of said switch.

* * * * *